(12) United States Patent
Eskra et al.

(10) Patent No.: US 11,011,737 B2
(45) Date of Patent: May 18, 2021

(54) SYSTEM AND METHOD OF FABRICATING AN ELECTROCHEMICAL DEVICE

(75) Inventors: Michael David Eskra, Saukville, WI (US); Paula Margaret Ralston, Frederick, MD (US); Rodney Mortensen LaFollette, South Jordan, UT (US); James Bernard Nowakowski, Washburn, WI (US)

(73) Assignee: Eskra Technical Products, Inc., Saukville, WI (US)

( * ) Notice: Subject to any disclaimer, the term of this patent is extended or adjusted under 35 U.S.C. 154(b) by 958 days.

(21) Appl. No.: 13/617,162

(22) Filed: Sep. 14, 2012

(65) Prior Publication Data

US 2013/0309414 A1    Nov. 21, 2013

Related U.S. Application Data (60) Provisional application No. 61/647,773, filed on May 16, 2012.

(51) Int. Cl.
| | |
|---|---|
| *H01M 4/04* | (2006.01) |
| *H01M 4/62* | (2006.01) |
| *H01M 4/1393* | (2010.01) |
| *H01M 4/1395* | (2010.01) |
| *H01M 4/1391* | (2010.01) |
| *H01M 10/0565* | (2010.01) |

(52) U.S. Cl.
CPC ....... *H01M 4/0404* (2013.01); *H01M 4/0419* (2013.01); *H01M 4/1391* (2013.01); *H01M 4/1393* (2013.01); *H01M 4/1395* (2013.01); *H01M 4/622* (2013.01); *H01M 4/623* (2013.01); *H01M 4/625* (2013.01); *H01M 10/0565* (2013.01)

(58) Field of Classification Search
None
See application file for complete search history.

(56) References Cited

U.S. PATENT DOCUMENTS

| | | |
|---|---|---|
| 2,304,073 A | 12/1942 | Brennan |
| 3,323,934 A | 6/1967 | Point |
| 5,447,806 A | 9/1995 | Hoge et al. |
| (Continued) | | |

FOREIGN PATENT DOCUMENTS

| | | |
|---|---|---|
| JP | 2001-351616 A | 12/2001 |
| JP | 2011-077014 A | 4/2011 |
| (Continued) | | |

OTHER PUBLICATIONS

Barletta et al., "Electrostatic Spray Deposition (ESD) of Polymeric Powders on Thermoplastic (PA66) Substrate," Elsevier, Science Direct, Surface & Coatings Technology, vol. 201, Jan. 5, 2006, pp. 296-308.

*Primary Examiner* — Joel G Horning
(74) *Attorney, Agent, or Firm* — Ziolkowski Patent Solutions Group, SC (57) ABSTRACT

A solventless system for fabricating electrodes includes a mechanism for feeding a substrate through the system, a first application region comprised of a first device for applying a first layer to the substrate, wherein the first layer is comprised of an active material mixture and a binder, and the binder includes at least one of a thermoplastic material and a thermoset material, and the system includes a first heater positioned to heat the first layer.

26 Claims, 5 Drawing Sheets

(56) References Cited

U.S. PATENT DOCUMENTS

| | | |
|---|---|---|
| 5,738,905 A | 4/1998 | Bevers |
| 5,840,444 A | 11/1998 | Takeshima et al. |
| 5,922,493 A | 7/1999 | Humphrey, Jr. et al. |
| 6,020,089 A | 2/2000 | Harada et al. |
| 6,033,722 A | 3/2000 | Koike et al. |
| 6,623,793 B2 | 9/2003 | Mushett et al. |
| 6,667,000 B1 | 12/2003 | Nakazato et al. |
| 6,833,009 B2 | 12/2004 | Gonzalez et al. |
| 7,077,932 B2 | 7/2006 | Ozaki et al. |
| 7,102,877 B2 | 9/2006 | Mitchell et al. |
| 7,295,423 B1 | 11/2007 | Mitchell et al. |
| 7,342,770 B2 | 3/2008 | Mitchell et al. |
| 7,352,558 B2 | 4/2008 | Zhong et al. |
| 7,384,433 B2 | 6/2008 | Mitchell et al. |
| 7,492,571 B2 | 2/2009 | Zhong et al. |
| 7,495,349 B2 | 2/2009 | Mitchell et al. |
| 7,508,651 B2 | 3/2009 | Mitchell et al. |
| 7,604,842 B2 | 10/2009 | Shida et al. |
| 7,722,686 B2 | 5/2010 | Xi et al. |
| 7,791,860 B2 | 9/2010 | Mitchell et al. |
| 7,791,861 B2 | 9/2010 | Zhong et al. |
| 7,882,622 B2 | 2/2011 | Polsonetti et al. |
| 7,883,553 B2 | 2/2011 | Mitchell et al. |
| 7,935,155 B2 | 5/2011 | Mitchell et al. |
| 8,048,478 B2 | 11/2011 | Hirokawa et al. |
| 8,072,734 B2 | 12/2011 | Zhong et al. |
| 8,192,869 B2 | 6/2012 | Teramoto |
| 8,591,601 B2 | 11/2013 | Zhong et al. |
| 8,815,443 B2 | 8/2014 | Mitchell et al. |
| 2003/0205835 A1 | 11/2003 | Eastin et al. |
| 2004/0029008 A1 | 2/2004 | Winterberg et al. |
| 2005/0266298 A1 | 12/2005 | Mitchell et al. |
| 2005/0271798 A1 | 12/2005 | Zhong et al. |
| 2005/0285080 A1 | 12/2005 | Suzuki et al. |
| 2006/0006063 A1 | 1/2006 | Tanaka et al. |
| 2006/0109608 A1 | 5/2006 | Zhong et al. |
| 2006/0133013 A1 | 6/2006 | Xi et al. |
| 2006/0134518 A1 | 6/2006 | Kogetsu et al. |
| 2006/0137158 A1 | 6/2006 | Zou et al. |
| 2006/0147712 A1 | 7/2006 | Mitchell et al. |
| 2006/0153972 A1* | 7/2006 | Hirokawa .............. H01G 9/058 427/79 |
| 2006/0230962 A1* | 10/2006 | Inukai et al. .............. 101/401.1 |
| 2006/0246343 A1 | 11/2006 | Mitchell et al. |
| 2007/0122698 A1 | 5/2007 | Mitchell et al. |
| 2007/0160909 A1 | 7/2007 | Sasaki et al. |
| 2007/0190424 A1 | 8/2007 | Mitchell et al. |
| 2008/0092808 A1 | 4/2008 | Mitchell et al. |
| 2008/0102371 A1 | 5/2008 | Mitchell et al. |
| 2008/0117565 A1 | 5/2008 | Zhong et al. |
| 2008/0145762 A1 | 6/2008 | Adachi et al. |
| 2008/0199781 A1 | 8/2008 | Lunt et al. |
| 2008/0204973 A1 | 8/2008 | Zhong et al. |
| 2009/0098459 A1 | 4/2009 | Takezawa et al. |
| 2009/0193648 A1 | 8/2009 | Inda |
| 2009/0197178 A1 | 8/2009 | Inda |
| 2009/0239127 A1 | 9/2009 | Xi et al. |
| 2009/0242507 A1 | 10/2009 | Ando et al. |
| 2009/0321678 A1 | 12/2009 | Zhong et al. |
| 2010/0014215 A1 | 1/2010 | Zhong et al. |
| 2010/0033901 A1 | 2/2010 | Mitchell et al. |
| 2010/0055569 A1* | 3/2010 | Divigalpitiya ........ H01M 4/661 429/231.5 |
| 2010/0099029 A1 | 4/2010 | Kinoshita et al. |
| 2010/0110613 A1 | 5/2010 | Zhong et al. |
| 2010/0263910 A1 | 10/2010 | Mitchell et al. |
| 2010/0323244 A1 | 12/2010 | Chiang et al. |
| 2011/0031935 A1 | 2/2011 | Miyoshi et al. |
| 2011/0104564 A1* | 5/2011 | Matsui ................ H01M 4/0445 429/199 |
| 2011/0143018 A1 | 6/2011 | Peng et al. |
| 2011/0143019 A1 | 6/2011 | Mosso et al. |
| 2011/0165318 A9 | 7/2011 | Zhong et al. |
| 2011/0206974 A1 | 8/2011 | Inoue et al. |
| 2011/0274828 A1 | 11/2011 | Nagamatsu |
| 2012/0040243 A1 | 2/2012 | Zhong et al. |
| 2013/0189577 A1 | 7/2013 | Wang et al. |
| 2013/0218241 A1 | 8/2013 | Savoy et al. |
| 2013/0266019 A1 | 10/2013 | Sugie |
| 2014/0030590 A1 | 1/2014 | Wang et al. |
| 2014/0178603 A1 | 6/2014 | Shieh |
| 2014/0295095 A1 | 10/2014 | Langlois et al. |

FOREIGN PATENT DOCUMENTS

| | | |
|---|---|---|
| JP | 2011-216227 A | 10/2011 |
| JP | 2012-009170 A | 1/2012 |
| JP | 2014-041793 A | 3/2014 |
| WO | 2005008807 A2 | 1/2005 |
| WO | 2012075423 A2 | 6/2012 |

* cited by examiner

SYSTEM AND METHOD OF FABRICATING AN ELECTROCHEMICAL DEVICE

CROSS-REFERENCE TO RELATED APPLICATION

The present application claims priority to U.S. Provisional Application 61/647,773 filed May 16, 2012, the disclosure of which is incorporated herein.

GOVERNMENT RIGHTS IN THE INVENTION

The U.S. Government has a paid-up license in this invention and the right in limited circumstances to require the patent owner to license others on reasonable terms as provided for by the terms of SP4701-09-D-0049 CLIN 0002 awarded by Defense Logistics Agency.

BACKGROUND OF THE INVENTION

Embodiments of the invention relate generally to a dry, solvent-free method and apparatus for fabricating electrodes and, more particularly, to a method and apparatus for forming lithium electrochemical cells in a lithium-ion (Li-ion) battery.

Typically, power sources, such as batteries, capacitors and fuel cells contain a positive and negative electrode. Depending on the chemistry of the power source, manufacturing methods vary. Many methods, such as those used in the Li-ion industry, include mixing active materials, conductive materials and binders in a wet slurry, using a solvent, and applying to a substrate. The application may be via doctor blade, roll transfer coating, slot die or extrusion.

The cast electrodes are then dried in ovens, while the solvent is recaptured so as not to allow fumes to escape into the environment, or the solvent is used as supplemental fuel for the drier. This process is time-consuming and expensive. The ovens are usually very large, long, expensive and space-consuming as well. The solvents are typically flammable, hard to remove from the chemical structure, bad for the environment, and costly to handle correctly, both environmentally and from a safety perspective. If solvent recovery is desired the solvent needs to be captured, condensed, cleaned and prepared for reuse or disposal.

Some known methods of power source manufacturing have moved away from solvent slurries on one electrode, but typically still use a solvent-based method on the other electrode. The non-solvent method usually includes pressing or extruding a mix of active materials, conductive materials and binder into an electrode, which then is attached to a substrate or current collector. Present day manufacturing techniques therefore limit throughputs, and the cost of such electrodes can be excessive.

The electrodes made through the solvent casting and subsequent extraction typically exhibit good adhesion to the current collector when the dried electrode is mechanically coined. The act of solvent casting and subsequent extraction leaves the binder and electrode structure open, similar to that of a sponge structure. The coining operation crushes the electrode structure back down leaving a porosity of 30 to 50%. Upon wetting with the electrolyte this crushed sponge-like structure relaxes and exhibits what is commonly referred to as swelling of the electrode. The typical anode binder, known as PVDF-Polyvinylidene fluoride or polyvinylidene difluoride (PVDF), is a highly non-reactive and pure thermoplastic fluoropolymer produced by the polymerization of vinylidene difluoride. It is one of the few known binders that do not readily react at the lithium potential of the anode and thus is typically preferred as a binder in Li-ion batteries.

Some manufactures have tried to develop processes using polytetrafluoroethylene (PTFE) and fibrillating the binder as to create a free standing film. This active material loaded free standing film is then pressed onto a current collector to be made into an electrode. PTFE is not stable at the Lithium ion anode potential so its use is limited to that of a cathode binder. Other manufacturers have tried to use water based binders to create the lithium electrode structure. They have difficulty with drying the electrode thoroughly to prevent the moisture reacting with the lithium salts, detrimentally affecting the performance of the resulting battery.

Thus, the preferred method of fabricating Li-ion batteries typically includes a solvent-based method, for at least one electrode, that meet demanding performance requirements, while also meeting demanding and rigorous life requirements (by exhibiting adequate adhesion to the base material). However, because of the costs associated with handling, reclaiming, and ultimately disposing of these environmentally challenging solvents, the cost of manufacturing Li-ion and other solvent-based electrodes can be excessive.

Therefore, it would be desirable to design a solvent-free method and apparatus for fabricating electrodes.

BRIEF DESCRIPTION OF THE INVENTION

The invention is a directed method and apparatus for fabricating electrodes and, more particularly, for forming lithium electrochemical cells in a lithium-ion (Li-ion) battery.

According to one aspect of the invention, a solventless system for fabricating electrodes includes a mechanism for feeding a substrate through the system, a first application region comprised of a first device for applying a first layer to the substrate, wherein the first layer is comprised of an active material mixture and a binder, and the binder includes at least one of a thermoplastic material and a thermoset material, and the system includes a first heater positioned to heat the first layer.

According to another aspect of the invention, a solvent-free method of manufacturing an electrode includes feeding a substrate through a feed mechanism, applying a first layer comprised of an active material mixture and a binder to the substrate, wherein the binder includes at least one of a thermoplastic material and a thermoset material, and heating the first layer with a first heater.

According to yet another aspect of the invention, a computer readable storage medium having stored thereon a computer program comprising instructions which when executed by a computer cause the computer to cause a substrate to feed through an electrode fabrication system via a feed mechanism, apply heat to the substrate via a first heater, and cause a first layer to be applied onto the substrate, the first layer comprised of an active material mixture and a binder, and the binder includes at least one of a thermoplastic material and a thermoset material.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

According to embodiments of the invention, electrodes for energy storage devices, such as lithium ion batteries, are fabricated using a solvent-free method and apparatus.

Figure 1:
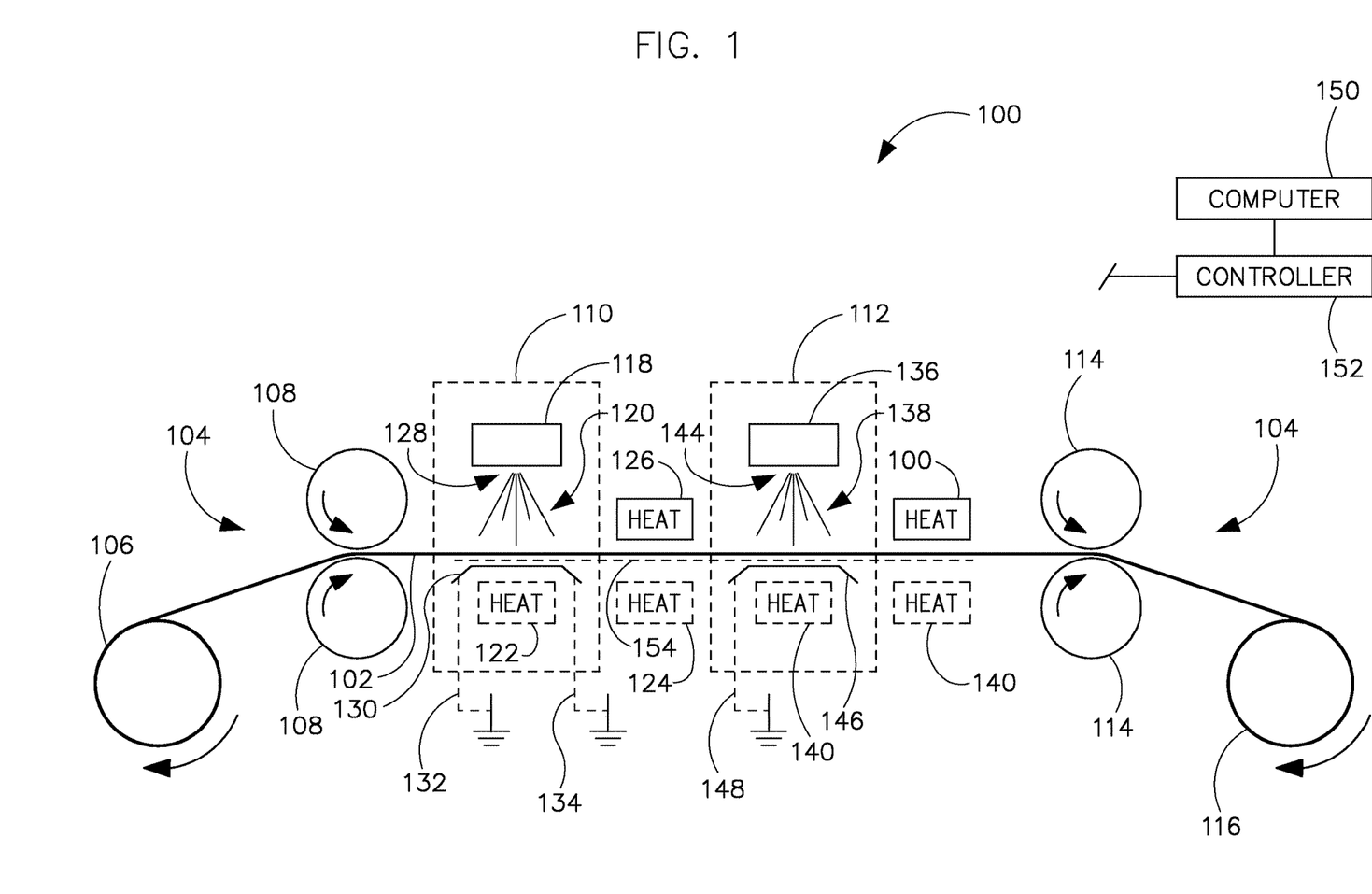
FIG. 1 illustrates components of a system for forming active electrode materials on an electrode substrate, according to an embodiment of the invention.

FIG. 1 illustrates a system 100 for fabricating electrodes by depositing binder and active electrode material on one side of a substrate 102 (otherwise known as a current collector in a finished electrode). The substrate 102 can include in one example copper as an anode current collector or aluminum as a cathode current collector. In another example, the anode current collector is a composite that includes for instance steel. As other examples, substrate 102 could also include but is not limited to a nickel plated steel, a composite of fibrous carbon, a tin dioxide ($SnO_2$), and could be for instance a punched solid sheet or an expanded composite (i.e., having perforations that allow for an open expansion of the substrate to reduce weight or allow higher mechanical or material loading). However, the invention is not so limited and any substrate or collector material may be used to form an electrode having other active material(s), according to what is known in the art. The active material or active material mixture includes but is not limited to lithium titanate oxide (LTO), cobalt oxide, nickel oxide, manganese oxide, nickel cobalt manganese oxide, iron phosphate, iron oxide, carbon, and silicon.

Substrate 102 is fed through a feed mechanism or roller system 104 having a feed mandrel 106 that provides material for substrate 102 and which is guided by oppositely rotating guide mandrels 108. In embodiments of the invention, substrate 102 may be a single sheet of electrode, or may be a continuous feed thereof. Substrate 102 is fed through a first application region 110 and through a second application region 112 during which time mixes that may include binder, active material, and conductive material are applied or otherwise sprayed onto substrate 102. Heat is applied within application regions 110, 112, and/or after passing therethrough as will be further described, in order to effect binding and formation of electrode materials. Substrate is passed through a second set of guide mandrels 114 that guide the substrate, having active electrode material bound thereto, toward a collection mandrel 116. According to the invention, second set of guide mandrels 114 may be designed having a space or gap therebetween that is maintained during operation in order to compress substrate 102 having the electrode thereon to a final desired and consistent thickness.

First application region 110 includes a device 118 for applying a first layer to substrate 102 that includes a spray mechanism (such as a spray gun or other known devices for causing a spray) that is configured to spray 120 a first or base layer of a mix of material onto substrate 102. In general, although first application region 110 is described as having a spray mechanism or gun in order to apply material onto the substrate, and such is illustrated as "spray 120", it is contemplated that any mechanism may be used to apply the material, to include painting, brushing, powder coating, using a fluidized bed, doctor blading, or wiping with a rag, as examples. In fact, in this and all subsequent application regions described, it is contemplated that a spray gun or other known spray device may be employed for applying first and subsequent layers to the substrate 102, or any mechanism may be used to apply the materials, as described above, and that the term "spray" may be applied to any mechanism or means that are used to apply a liquid to a surface.

According to the invention, device or spray mechanism 118 causes spray 120 to emit between approximately 2 and 20 psi. According to the invention, spray 120 includes a mix of binder, conductive carbon, and active electrode material. The binder, according to one embodiment, includes a thermoplastic or a thermoset material, which in one embodiment is polyvinylidene fluoride (PVDF) ranging between 6-85% by weight of the total material in spray 120. However the invention is not to be so limited, and for instance binder levels as low as 1% or as high as 100% may be used. Further, the invention is not limited to PVDF, but may include any binder that is known within the art that include, according to embodiments of the invention and as stated, thermoplastics and thermoset materials. As known in the art, thermoplastics are a polymer that becomes pliable above a certain temperature, and returns to a solid stated upon cooling. In contrast and as also known in the art, a thermoset material forms an irreversible chemical bond during the curing process, which breaks down upon melting (and does not reform upon cooling). According to embodiments of the invention, the binder may be PVDF or any derivative thereof, or PTFE or any derivative thereof, as examples. According to another embodiment of the invention, a very high molecular weight polyethylene material may be included in the binder to add structural integrity to the binder. The conductive carbon, as known in the art, may be included in order to cause or enhance electrical contact between particles within the electrode.

Spray 120 may also includes generally 4-8% conductive carbon to include a graphite such as TIMREX® KS6 (TIMREX is a registered trademark of Timcal SA of Switzerland) (although increased amounts of conductive carbon to 17% or higher and up to, for instance, 40% may be used, according to the invention). The balance % of spray 120 is active electrode materials which include but are not limited to LTO, cobalt oxide, nickel oxide, manganese oxide, nickel cobalt manganese oxide, iron phosphate, iron oxide, carbon, and silicon. As one example, spray 120 includes 13% binder and 8% conductive carbon, and the balance of spray 120 is 79% active material, by weight.

According to the invention, spray 120 deposited upon substrate 102 within first application region 110 is heated in order to initiate binding of the first layer mix to substrate 102. In one embodiment, a heater 122 is positioned opposite device 118 and adequate power is provided to heater 122 to raise the temperature of substrate to between approximately 100° F. and 500° F., and in one embodiment to 300° F. However, in another embodiment, a heater 124 is positioned to heat a surface of substrate 102 opposite a surface of substrate 102 to which spray 120 is applied. In this embodiment as well, heater 124 is powered to raise the temperature of substrate to between approximately 100° F. and 500° F., and in one embodiment to 300° F. Heat may also be applied, in one embodiment, via a heater 126 to the base layer after passing through first application region 110 at least until the first layer is visibly molten, or begins to flow or wet, after which the first layer may be allowed to cool prior to applying a subsequent layer of electrode material. Thus, according to the invention, a first layer or base layer of electrode material is applied to substrate 102 and binding thereto is initiated via one or both heaters 122, 124. The binder of base layer may also be melted throughout using heater 126 in order to cause the base layer to melt and uniformly form on substrate 102. Heaters 122, 124, and 126 may apply heat through any number of known mechanisms. For instance, heaters 122-126 may include infrared (IR) heaters, convective heaters, conductive heaters, radiant heaters (for instance, outside the IR spectrum), or induction heaters, as examples.

Heaters 122/124 and heater 126 generally serve different purposes. For instance, heaters 122/124 provide heat that is directed toward the substrate 102 in order that the binder material in contact with substrate 102 is caused to melt and flow and solidly adhere to substrate 102. Heater 126, on the other hand, is generally directed toward heating and causing to flow the bulk of the sprayed material that forms the base layer. In such fashion, according to the invention, heat may be provided to either side of substrate 102, and heaters 122 and 124 may be provided at different locations relative to device 118, depending on such factors as the amount of binder in spray 120. Thus, different types of heaters may be used for the different desired type of heating to be performed. For instance, heaters 122 and/or 124 may be induction heaters that cause primarily substrate 102 to heat, while heater 126 may be an IR, convective, or radiant heater. In another example, one or all heaters (122 and/or 124 and 126) are IR heaters. In fact, any combination of heaters may be used, according to the invention, depending on the desired type of heating to be performed (substrate versus a layer of applied material)

As known in the art, it is generally desired to maximize the amount of active material within the electrode. Thus, it is also desired to minimize the amount of binder used in spray 120, however under the constraining guideline that adequate binding be obtained in the base layer sprayed onto substrate 102 in first application region 110. Binding of the first layer of sprayed material 120 is affected by not only the types of heaters, temperatures obtained, and the like, but also by the amount of binder, conductive carbon, and active material present in spray 120. As known in the art, particle size may be actively selected based on the type of electrode to be formed, and may range from as low as nanometer-sized particles to hundreds of microns and greater. Particle size may also be varied throughout the depth of the electrode. As such, particle size of the active material influences not only the amount of active material that may be deposited in the base layer, but the amount of binder as well and the amount of heat applied to initiate binding of the base layer.

According to the invention, device 118 may include a spray gun having an electrostatic charge applied thereto in order to guide and accelerate particles in spray 120 toward substrate 102. Known spray mechanisms include an electrostatic charge that is applied typically proximate a nozzle 128 of the spray gun 118 in order that the particles emitting from nozzle 128 are imparted with the charge, causing an electrostatic voltage differential to form between nozzle 128 and substrate 102. According to one embodiment, the electrostatic voltage applied to nozzle 128 is 25 kV, however the invention is not to be so limited and any voltage may be applied, above or below 25 kV, according to the invention, in order that spray 120 is uniformly applied to substrate 102. The voltage differential may be enhanced by grounding a region of substrate 102 toward which spray 120 is directed. Because substrate 102 is caused to pass continuously through first application region 110, it may be inconvenient to directly ground substrate 102. Thus, according to the invention, a support structure 130 may be provided over which substrate 102 passes. Support structure 130 is stationary and in electrical contact with substrate 102, thus grounding of substrate 102 may be effected by providing a ground line 132 that is attached to support structure 130. According to one embodiment, multiple ground lines may be included (represented by a second ground line 134, but many may be included according to the invention) in order to more uniformly ground substrate 102 proximate where spray 120 impinges thereon.

System 100 includes second application region 112 which causes a second layer to be deposited onto substrate 102. Second application region 112 includes a device 136 (such as a spray gun or other known devices for causing a spray, as described) that causes spray 138 to emit toward substrate 102 and land or impinge on the first layer applied in first application region 110. Because adhesion from one electrode layer to the next tends to be easier to achieve compared to the initial base layer to substrate 102, spray 138 for the second and any subsequent electrode layers typically includes less binder. Thus, according to one embodiment of the invention, spray 138 includes 80-90% active material by weight (including but not limited to LTO, cobalt oxide, nickel oxide, manganese oxide, nickel cobalt manganese oxide, iron phosphate, iron oxide, carbon, and silicon), 4-8% conductive carbon by weight, and the balance as binder (PVDF in one embodiment). However the invention is not to be so limited, and for instance binder levels in the second electrode layer (and any subsequent layers) as well can be as low as 1% or as high as 100%. In fact, any composition and percentage thereof of active material and binder may be included, according to the invention, in the first layer and in the second and subsequent layers applied thereto.

According to the invention one or both heaters 140 may be included that provide heat to substrate 102. However, because substrate 102 already has a base layer thereon from first application region 110, heaters 140 may not be necessary as the base layer also provides a thermally insulating barrier to be formed. Also, heaters 140 may not be included because binding from one electrode layer to the next can be more effective and heat from a heater 142 may be adequate to cause the subsequent electrode material from spray 138 to melt and flow when it is visibly molten.

Heaters 140 (if used) and 142 may provide heat from any number of known methods, to include IR heaters, convective heaters, radiant heaters, or induction heaters, as examples. Further, device 136 may also include spray mechanism having a nozzle 144 to which an electrostatic charge may be applied as well, such as 25 kV. Application region 112 may include a support 146 and one or more ground lines 148 for enhancing the deposition of spray 138 onto the base layer previously applied.

According to the invention, system 100 includes a computer 150 with a computer readable storage medium and having stored thereon a computer program comprising instructions to execute control commands via a controller 152. In such fashion, controller 152 can be caused to control operation of the spray stations, heaters, and roller mechanism as known in the art and as described according to the operation above.

Figure 2:
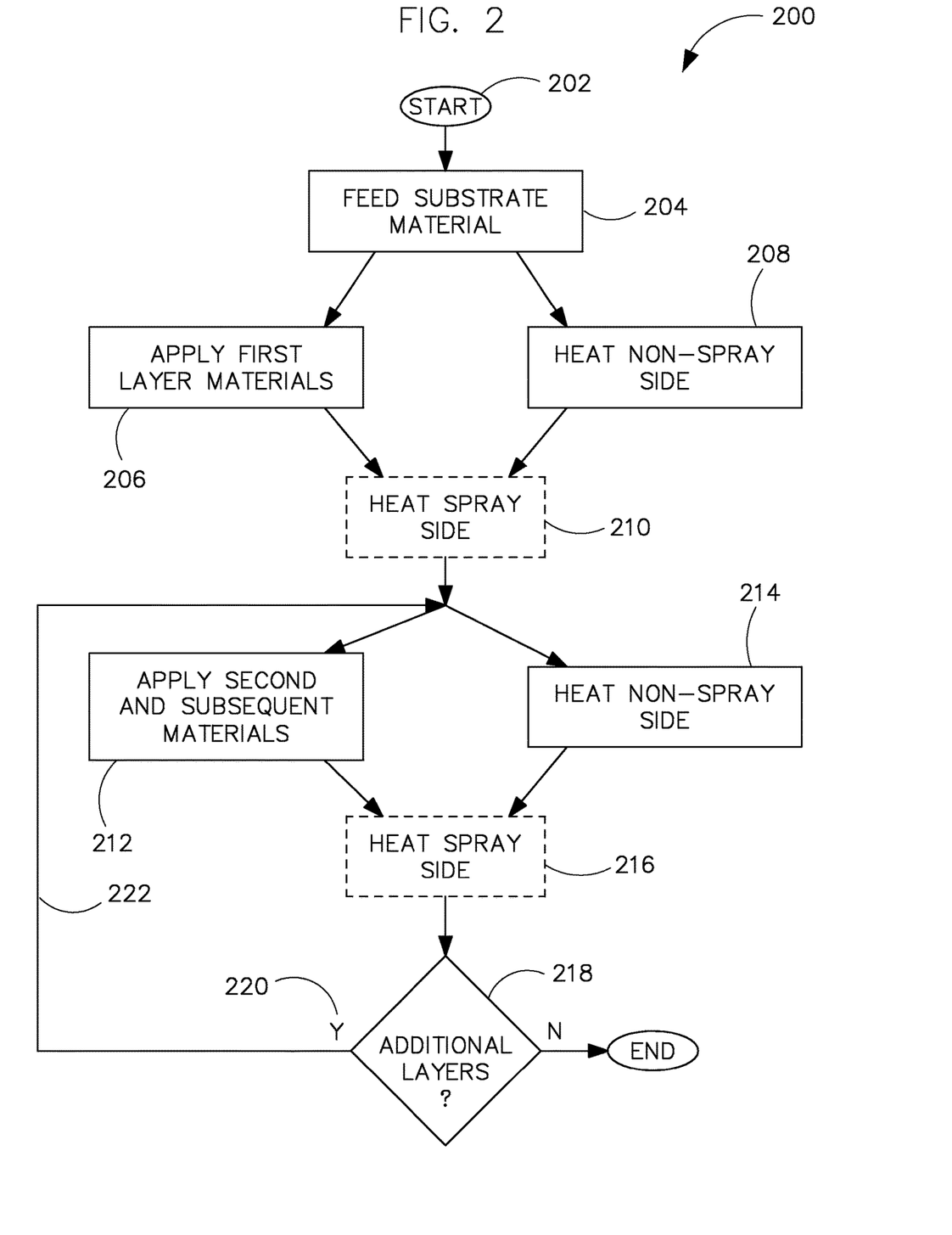
FIG. 2 illustrates steps for applying a base layer to an electrode substrate and one or more electrode layers of active material thereto according to embodiments of the invention.

The operation of system 100 of FIG. 1 can be summarized in a set of steps within a block diagram 200 as illustrated in FIG. 2. Starting at step 202, a substrate material is fed 204 and a first layer or base layer of binder, conductive carbon, and active material is applied onto the substrate at step 206. Heat is applied to the non-sprayed side of the substrate at step 208 and, as stated, may include a heater immediately opposite the location of the spray at step 206 and simultaneous therewith, and/or heat may be applied to the non-sprayed side of the substrate after the substrate is caused to pass through a region or zone where the base layer is applied. The spray side may then be heated at step 210 after which a first layer is formed on the substrate. A second layer of binder, conductive carbon, and active material is sprayed onto the first layer at step 212. As stated, the non-spray side may be heated 214 with heaters immediately opposite the second spray region, or subsequent thereto as represented by heaters 140 of FIG. 1. Heat may also be applied to the spray side 216 in order to cause the binder of the second layer to melt and flow. As alluded to, subsequent layers may be applied to the electrode layers by repeating the process described. That is, referring to FIG. 1, additional spray stations such as second application region 112 may be included, generally without limit, within system 100 in order to add additional layers. Thus, at step 218, if additional layers are desired 220, block diagram 200 illustrates a return 222 in order that subsequent layers may be added. In other words, return 222 does not represent physically returning the part through second application region 112 but instead illustrates that system 100 may include numerous spray stations in its design in order to obtain a final desired thickness.

As also alluded to, each of the subsequent spray stations may include a spray mix of different quantities of binder, conductive carbon, and active material, depending on the design of the desired final electrode. As known in the art, it may be desirable in one example to have a gradient of particle sizes within a depth of an electrode where the smallest active material particles are nearest the substrate and the largest active material particles are toward the outer surface of the electrode. Conversely it may be desired to have larger particles proximate the substrate and smaller particles toward the outer surface of the electrode. Or, it may be desirable to have a uniform active material particle size throughout the electrode. Such designs are generally understood within the art and all may be formed according to embodiments of the invention. That is, thickness of each layer as well as particle size within each layer may be selected and controlled as subsequent layers are added during the formation of the electrode in order to achieve the desired particle size gradient of active material within the electrode.

There may be several advantages to being able to build up amorphous layers of varying material particle size or having different active materials in an electrode. In one example layering larger particle sizes closer to the current collector, and progressively smaller particle sizes as the electrode thickness is built up away from the current collector, may allow for higher power and higher energy density and cycle life as compared to an electrode built from a single, bimodal or trimodal particle size distribution that has been processed through a solvent cast method with a given binder. The process described would also allow for varying the binder and conductive additives as necessary to optimize the performance of the electrode for a given application. This would change the electrode active material matrix from an amorphous to more or less discreet layers with excellent interfacial conductivity.

This ability to layer without causing interfacial resistance is a significant improvement over conventional solvent based technology and other known methods. The layering method described in this invention is such that interfacial resistance is not apparent as one experienced in the art would expect. In fact the resistance or impedance is lower than is expected demonstrating that the method being disclosed is superior to that of solvent based methods of applying active material to a current collector and is a significant improvement to the art.

Figure 3:
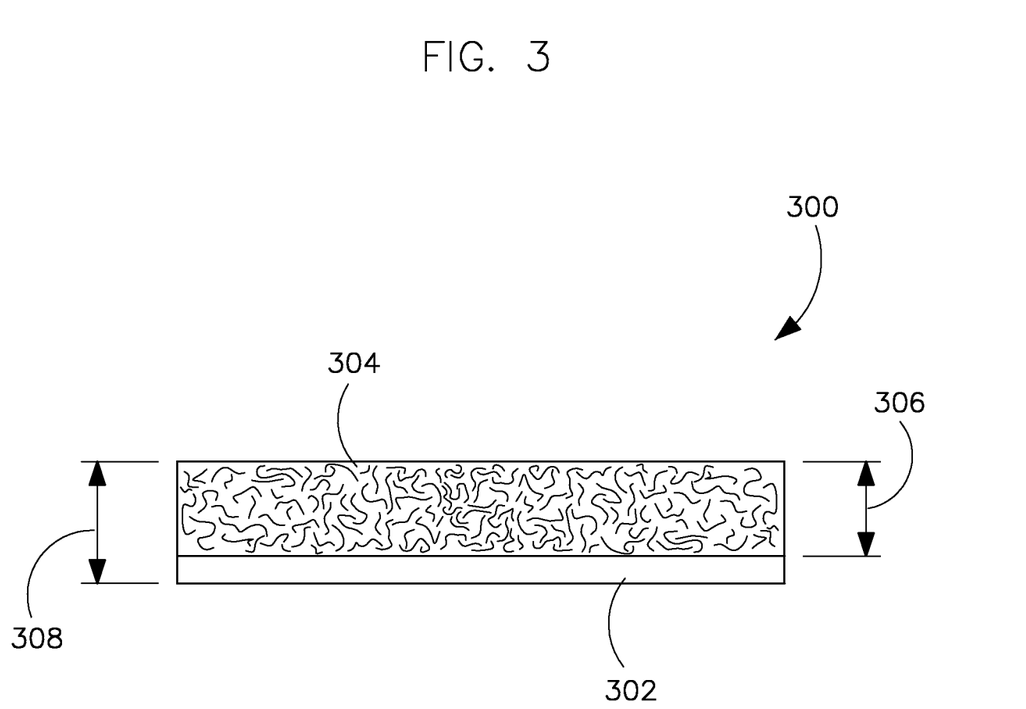
FIG. 3 illustrates a base layer having an electrode formed thereon using an embodiment of the invention.

Referring now to FIG. 3, electrode 300 includes a substrate 302 that corresponds to substrate 102 of FIG. 1. Electrode 300 includes one or more layers of active material mix in binder 304 and, as stated, may include a gradient of particle thicknesses throughout a thickness 306 thereof. Electrode 300 may also have a total thickness 308 that is controlled by selectively applying the appropriate number of layers as well as by compressing the substrate and layers as the finished product passes through guide mandrels 114 as illustrated in FIG. 1. According to the invention therefore, final single-sided electrode thicknesses of 0.0005" to 0.015" or greater may be fabricated. In fact there is in principle no limit to how thin or how thick the electrode thicknesses may be. In terms of thinness, a layer as thin as a single active material size may be achieved. In terms of thickness, limitations are based only on the number of application stations and perhaps based on more fundamental limits tied to electrochemical performance.

Figure 4:
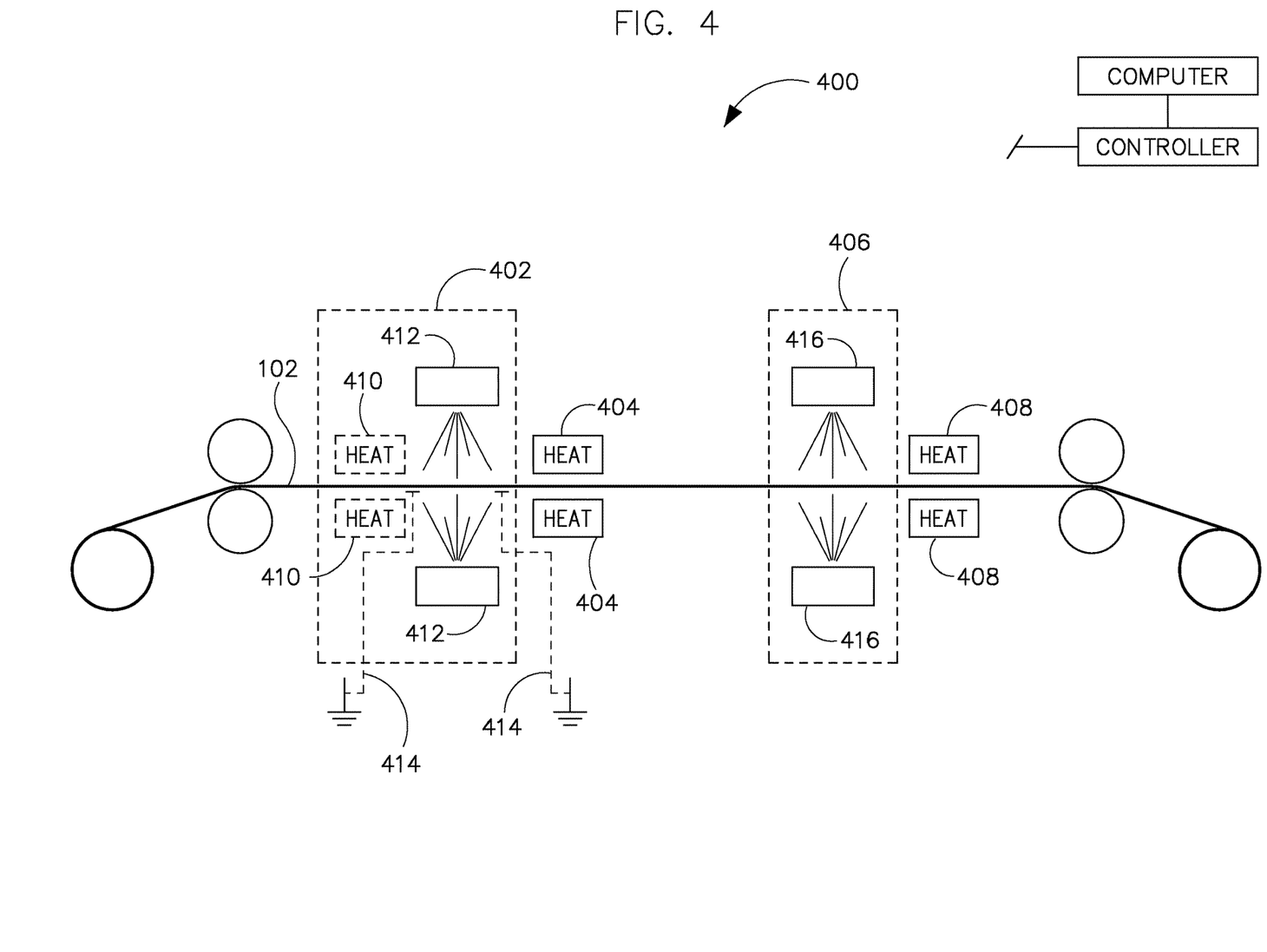
FIG. 4 illustrates components of a system for forming active electrode materials on two sides of an electrode substrate, according to an embodiment of the invention.

The principles described above with respect to FIGS. 1 and 2 can be applied in order to fabricate two-sided electrodes. That is, a substrate may be passed through a system in which spray is applied to both sides of the substrate and subsequent layers in order to cause active material build-up on each side of the substrate. Referring now to FIG. 4, in double-sided coating system 400, substrate 102 may be caused to move through a first double-sided coating station 402 to spray initial layers on each side of substrate 102. System 400 includes heaters 404 and a second spray station 406 that is illustrative of stations that can be used, in conjunction with additional heaters 408 corresponding to a respective spray station 406. In other words, as with system 100 of FIG. 1, multiple spray stations may be included within system 400 in order to form multiple subsequent layers in building up the double-sided electrode. System 400 may include heaters 410 on one or both sides of the substrate that cause the substrate to be pre-heated and thereby enhance heating of the substrate prior to spraying of the base layers on each side, thereby enhancing adhesion of the base layers to the substrate 102. Spray mechanisms 412 may include electrostatic charge or not, and one or more corresponding ground lines 414 may be included as well. Heaters 410 and spray stations 412 may be staggered and offset from one another, or positioned such that one of heaters 410 is opposite one of spray stations 412, and the other of heaters 410 is opposite the other of spray stations 412, according to the invention. Second spray station 406 likewise includes spray mechanisms 416 that may or may not be electrostatically controlled, as well as grounded via ground lines to the substrate (not shown in spray station 406).

Figure 5:
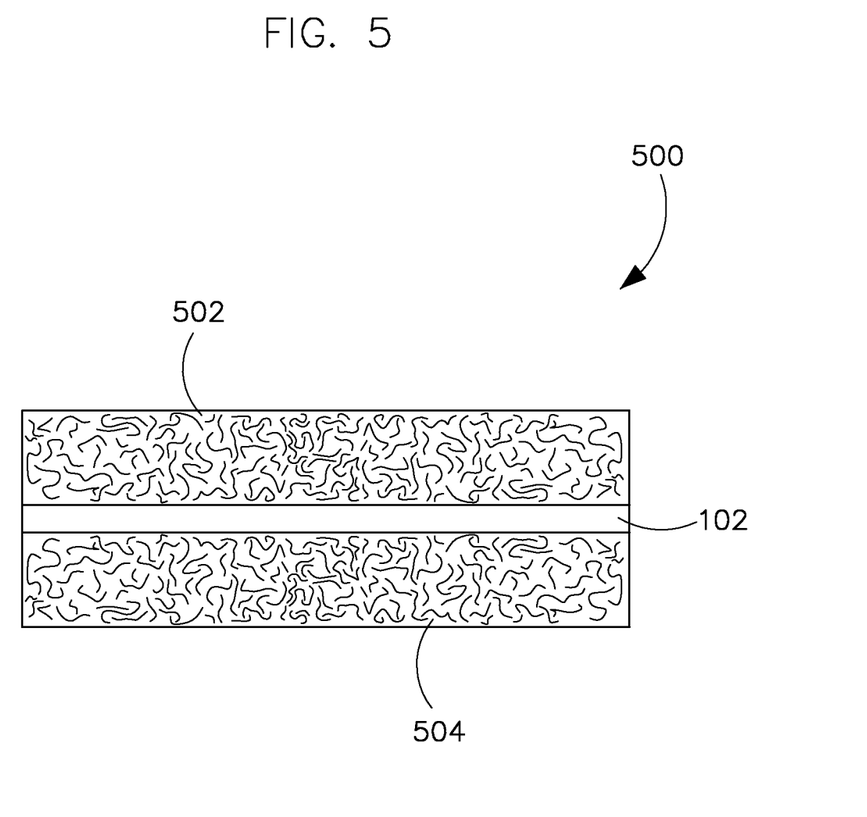
FIG. 5 illustrates a base layer having an electrode formed on two sides of an electrode substrate using embodiments of the invention.

In such fashion a double-sided electrode 500 may be formed having substrate 102 and first active material layer 502 and second active material layer 504 formed thereon. As with the single sided embodiment, particle size gradients and overall thickness can be controlled using the appropriate particle size within each spray station and using compression mandrels 418. According to the invention therefore, final double-sided electrode thicknesses of 0.0010" to 0.030" or greater may be fabricated.

According to one embodiment, a metal belt 154 may be added to the coating systems such as system 100 of FIG. 1. The metal belt may extend the length of the system over which the substrate is caused to pass. That is, instead of using individual support structures 130 and 146, a single belt may be provided to enhance grounding in the spray area(s) as the substrate moves through. This may be of particular interest when less conductive materials are used such as thin metals, composite structures, open weave, foam-like, or non-woven substrates. Also, when small run lots of electrodes are desired, with the steel belt in place, the machine could be reversed to either build up electrode active material thickness or to possibly layer differing active materials to enhance final electrochemical performance. Another benefit of using a belt machine would be to allow free standing films of active material to be made using the method so that these films could be used in other applications where a strong bond to a substrate or current collector is not as strongly needed in the product design. The belt machine would also allow for faster change over from electrode types.

Dual coating can be achieved by either applying active material on both sides at once (i.e., FIG. 4), or by repeating single sided coating by rolling or flipping the web (i.e. re-running through the embodiment of FIG. 1 with the reverse side of substrate 102 coated) and whether in a vertical or horizontal fashion and either repeating the application zones or revisiting the application zones. That is, although FIGS. 1 and 4 illustrate substrate 102 passing orthogonal to the earth gravitational field, according to the invention the substrate may be passed collinear with the gravitational field. In other words, the system for coating may drive the substrate in a vertical direction according to embodiments of the invention. Other methods to do the same would be to either make a longer machine with more stations or coil and uncoil the web again passing through in the same direction, or taking the web back over the machine to save space. Lithium ion electrodes are therefore fabricated without solvents, which perform as well as conventionally made electrodes using solvent processes. The electrodes can be made at any thickness, density and with any known active materials.

The process illustrated herein is not limited to very thin electrodes. Finished electrode thickness range from 0.0005" to over 0.015" (single sided, and approximately double the thickness for double-sided electrodes) and thicker electrodes are possible, limited to an extent only by the number of layering stations. Further, the process is not limited to battery electrodes but may be extended to manufacturing a separator layer in a similar fashion, enabling a full cell to be manufactured on one line approaching a just in time delivery capability.

Electrode density is also be adjustable and controllable. A solvent-cast electrode typically includes coining to gain or improve performance. According to the invention, both coined and un-coined electrodes are fabricable from the process with no apparent difference in performance. A solvent cast system normally targets a 30-40% open structure after coining, and relaxation with cycling and polymer solvation will move the porosity back to the 50% range. However, the process illustrated herein creates porosities from 15% to 50% with or without secondary coining. Not having to coin and experience the relaxation after solvation with electrolyte addition thus improves overall cycle life.

Further, the amount of binder is lowered in the internal structure of the active material relative to a solvent cast system. In a solvent cast system the polymer binder often enters the internal structure of the active material. However, the process described maintains the majority of the binder on the outside of the active materials, resulting in higher utilization of the active material when compared with the solvent cast systems.

In a solvent cast line, the solvent, normally N-Methyl-2-pyrrolidone (NMP), or methyl ethyl ketone (MEK), or other known solvents, are typically added to the active material and then removed at a rate which does not cause cracking or flaking of the cast electrode. This typically includes extensive drying ovens and solvent recovery systems. Sometimes the solvent will be used as part of the fuel to heat the oven. Either way the requirement to remove the solvent creates the need for extensively long drying ovens, >200 feet, and other chemical handling equipment. Eliminating solvents in the casting process also reduces the possibility of contaminating the electrolyte and cell when proper airing time is not available.

Finally, the process illustrated herein does not alter the existing battery chemistry. The same binders, active materials and conductive additives are used as in conventional solvent-based methods, with no other ingredients added. That is, the performance of the electrode in terms of resistance, power, and fade rate are comparable to batteries formed in a solvent-based system.

A technical contribution for the disclosed method and apparatus is that it provides for a computer implemented dry, solvent-free method and apparatus for fabricating electrodes and, more particularly, to a method and apparatus for manufacturing or creating lithium electrochemical cells in a lithium-ion (Li-ion) battery.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, a solventless system for fabricating electrodes includes a mechanism for feeding a substrate through the system, a first application region comprised of a first device for applying a first layer to the substrate, wherein the first layer is comprised of an active material mixture and a binder, and the binder includes at least one of a thermoplastic material and a thermoset material, and the system includes a first heater positioned to heat the first layer.

According to another embodiment of the invention, a solvent-free method of manufacturing an electrode includes feeding a substrate through a feed mechanism, applying a first layer comprised of an active material mixture and a binder to the substrate, wherein the binder includes at least one of a thermoplastic material and a thermoset material, and heating the first layer with a first heater.

According to yet another embodiment of the invention, a computer readable storage medium having stored thereon a computer program comprising instructions which when executed by a computer cause the computer to cause a substrate to feed through an electrode fabrication system via a feed mechanism, apply heat to the substrate via a first heater, and cause a first layer to be applied onto the substrate, the first layer comprised of an active material mixture and a binder, and the binder includes at least one of a thermoplastic material and a thermoset material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A solvent-free method of manufacturing an electrode comprising:
    feeding a current collector through a feed mechanism;
    applying a first layer consisting of an active material mixture, a binder, and a conductive material to the current collector; and
    heating the first layer with a first heater during and/or after application of the first layer to the current collector to bind the first layer to the current collector;
    wherein applying the first layer comprises applying of the active material mixture, the binder, and the conductive material to the current collector via a dry dispersion application; and
    wherein the binder consists of polyvinylidene fluoride (PVDF).

2. The solvent-free method of claim 1 comprising:
    heating the first layer with a second heater;
    applying subsequent active material, binder, and conductive material to the first layer to form a second layer; and
    heating the second layer with a third heater;
    wherein amounts of the subsequent active material, binder, and conductive material in the second layer are independently controlled from amounts of the active material mixture, binder, and conductive material in the first layer.

3. The solvent-free method of claim 1 wherein the active material mixture and conductive material are composed of non-fibrillatable materials.

4. The solvent-free method of claim 1 comprising heating the substrate on a first side of the substrate with the first heater, and applying the first layer on a second side of the substrate that is opposite the first side, wherein the heating with the first heater and applying the first layer are done simultaneously.

5. The solvent-free method of claim 1 wherein the dry dispersion application comprises a powder coating application.

6. The solvent-free method of claim 5 wherein the powder coating application is performed by a spray mechanism that sprays the active material mixture, the binder, and the conductive material to the substrate, the spray mechanism having an electrostatic charge applied thereto.

7. The solvent-free method of claim 1 wherein the dry dispersion application comprises one of a painting application, brushing application, wiping application, fluidized bed application or doctor blading application.

8. The solvent-free method of claim 1 wherein applying the first layer to the substrate comprises applying a first layer to each of opposing sides of the substrate.

9. The solvent-free method of claim 1 wherein the current collector is composed of one of copper, aluminum, nickel plated steel, or tin dioxide ($SnO_2$).

10. The solvent-free method of claim 1 wherein a majority of the PVDF is maintained on an outside of the active material mixture, based on a prevention of the majority of the PVDF from entering an internal structure of the active material mixture subsequent to application and heating of the first layer.

11. A dry, solvent-free method of manufacturing a battery electrode comprising:
    providing a substrate composed of a current collector material;
    advancing the substrate toward a first application region;
    coating a mixture of an active material and a polyvinylidene fluoride (PVDF) binder onto the substrate in the first application region to form a base layer;
    heating the base layer to cause the PVDF binder therein to adhere the base layer to the substrate;
    advancing the substrate toward a second application region;
    coating a second layer onto the base layer, the second layer comprising a mixture of an active material and a PVDF binder; and
    heating the second layer to cause the PVDF binder therein to adhere the second layer to the base layer;
    wherein the mixture of the active material and the PVDF binder in the base layer is independently controlled from the mixture of the active material and the PVDF binder in the second layer, such that amounts of the active material and PVDF binder in the base layer may differ from amounts of the active material and PVDF binder in the second layer and the type of active material in the base layer may differ from the type of active material in the second layer.

12. The method of claim 11 wherein coating the mixture onto the substrate comprises powder coating the mixture of the active material and the PVDF binder onto the substrate.

13. The method of claim 12 wherein powder coating the active material and the PVDF binder onto the substrate comprises one of spray coating, fluidized bed coating or brush coating the active material and the PVDF binder onto the substrate electrostatically.

14. The method of claim 11 wherein the active material mixture comprises at least one of lithium titanate oxide (LTO), cobalt oxide, nickel oxide, manganese oxide, nickel cobalt manganese oxide, iron phosphate, iron oxide, carbon, and silicon.

15. The method of claim 11 wherein heating the base layer comprises:
heating the substrate via a first heater and on a side of the substrate opposite the coated base layer, the heating of the substrate causing the base layer to adhere to the substrate; and
heating the base layer via a second heater positioned on a side of substrate from which the mixture was coated, the heating of the base layer causing the mixture of the active material and the PVDF binder to melt throughout such that the base layer is formed uniformly on the substrate.

16. The method of claim 11 wherein heating the base layer comprises heating the base layer via infrared heating.

17. The method of claim 11 wherein the mixture of the active material and the binder further comprises a conductive carbon mixed therewith.

18. The method of claim 11 wherein porosities of the base layer and the second layer from 15% to 50% are achievable without secondary coining.

19. The method of claim 11 wherein coating the base layer and the second layer comprises selecting and controlling a thickness of the base layer and the second layer and selecting and controlling a particle size of the active material in the base layer and the second layer.

20. The method of claim 11 wherein the active material in each of the base layer and the second layer is composed of one or more non-fibrillatable materials.

21. A dry, solvent-free method of manufacturing an electrode comprising:
providing a substrate composed of a current collector material;
feeding the substrate through a feed mechanism or roller system to advance the substrate to an application region;
applying a first layer comprising an active material mixture and a binder onto the substrate in the application region; and
heating the first layer during and/or after application of the first layer to the substrate to cause the binder therein to adhere to the substrate;
wherein the binder consists of polyvinylidene fluoride (PVDF); and
wherein the active material mixture is composed of one or more of lithium titanate oxide (LTO), cobalt oxide, nickel oxide, manganese oxide, nickel cobalt manganese oxide, iron phosphate, iron oxide, carbon, and silicon.

22. The method of claim 21 wherein applying the first layer comprises applying the active material mixture and the binder onto the substrate via a dry dispersion application.

23. The method of claim 22 wherein the dry dispersion application comprises powder coating the active material mixture and the binder onto the substrate via one of a spray coating application, fluidized bed coating application or brush coating application.

24. The method of claim 21 wherein heating the first layer is performed via heating of the substrate simultaneous with application of the first layer thereon.

25. The method of claim 21 wherein the first layer further comprises a conductive carbon mixed with the active material mixture and the binder.

26. The method of claim 21 further comprising compressing the substrate, the base layer and any additional layers of active material mixture and binder applied onto the base layer.

* * * * *